UNITED STATES PATENT OFFICE.

THOMAS SPENCER, OF SYRACUSE, NEW YORK.

IMPROVEMENT IN THE MANUFACTURE OF COMMON SALT.

Specification forming part of Letters Patent No. 28,513, dated May 29, 1860; Reissue No. 1,290, dated March 18, 1862.

*To all whom it may concern:*

Be it known that I, THOMAS SPENCER, of Syracuse, in the county of Onondaga and State of New York, have invented or discovered a new and useful means, method, or process whereby I neutralize and get rid of the injurious properties in common salt arising from the presence of the chloride of calcium and the chloride of magnesium; and I do hereby describe and ascertain the same in the following words, to wit:

Of all the salts found as impurities in the ordinary salt of commerce the chloride of magnesium and the chloride of calcium are the most deleterious on account of their deliquescent properties. The accumulation of dampness, and consequent lumping of the ordinary table-salt from this cause, is too generally known to enlarge upon, and it has been considered a desideratum worthy the attention of the best chemists to find a means of simply and cheaply getting rid of the difficulty. The well-known chemist Berthier devised a very ingenious method of getting rid of the chloride of magnesium during the "soccage" in the process of evaporation by adding slaked lime to the brine in the pan. It will be obvious that this process is a difficult and tedious one, which is imperfect. The salt still retains injurious qualities, and it adds to the expense of the manufacture, and requires skill in its employment. Like all means heretofore essayed it is used upon the brine alone.

My new improvement, and that which is its important distinguishing characteristic, is to apply the chemical ingredients to the salt after it has been crystallized and the "mother-water" drained therefrom. This constitutes an important change, and is the fundamental principle of my invention, simplifying the manufacture and decreasing the expense by lessening the quantity of material necessary to produce the desired result.

I will here briefly state what is well known to all who are conversant with the subject, that, as the crystals of salt are formed from brine containing the foreign matters above named, the salt is taken out of the pans into baskets or other suitable receptacles, and the mother-liquor, which is impregnated with these injurious foreign matters, is drained off, leaving so much of the chloride of calcium or magnesium as adheres to the crystals of salt, which is a very small percentage of the whole, but still sufficient to render the salt deliquescent and impure, so as to become yielding and lumpy in a damp atmosphere. To the crystallized salt, after it has been properly drained, I add in any convenient way a quantity of the carbonate or bicarbonate of soda, and incorporate the salt therewith by grinding them together or otherwise causing them to mix, so that an equivalent of the carbonate or bicarbonate of soda shall be brought into contact with the foreign matters aforesaid sufficient to convert the same into chloride of sodium (common salt) and carbonate of lime, a harmless impurity, so trifling in quantity as not to be appreciable in the mixture.

It is obvious that there are many ways of bringing the carbonates into contact with the impurities surrounding the crystals of salt. That which I believe to be simplest and cheapest is to mix the two by stirring and grinding, (a process which has to be performed in fitting crystallized salt for table use;) but I make no claim to any specific mechanical mode of bringing the carbonates above named into contact with the impurities, as they may be varied to suit the views and purposes of the manufacturer. Nor do I claim having made any new discovery of a chemical compound, as the elements and their affinities are all well known to the chemist; but up to the date of my invention no economical way had been discovered to use them in the practical manufacture of salt. Nor do I claim the employment of a solution of the carbonate of soda as proposed by Dubochet, and which he describes as too expensive to be generally used, or uniting the chemicals with crystallized salt by fusing them together, as that has already been essayed, without commercial advantage, however, as the process is too expensive.

What I claim, and desire to secure by Letters Patent, is—

Adding to common salt, after it has been drained and in a state of crystallization, the carbonate or bicarbonate of soda, so as to unite the same with the impurities, as and for the purposes set forth.

THOMAS SPENCER.

Witnesses:

J. J. GREENOUGH,

D. ROWLAND.